US008812026B2

(12) United States Patent
Alpert

(10) Patent No.: US 8,812,026 B2
(45) Date of Patent: Aug. 19, 2014

(54) SYSTEM AND METHOD FOR AUTONOMOUS CONNECTIVITY TO IMPROVE LOCATION-BASED INFORMATION

(71) Applicant: Yaron Alpert, Hod Hasharon (IL)

(72) Inventor: Yaron Alpert, Hod Hasharon (IL)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 13/675,289

(22) Filed: Nov. 13, 2012

(65) Prior Publication Data

US 2014/0135034 A1 May 15, 2014

(51) Int. Cl.
*H04W 24/00* (2009.01)
*H04W 4/22* (2009.01)
*H04W 4/04* (2009.01)
*H04W 64/00* (2009.01)
*H04W 48/04* (2009.01)

(52) U.S. Cl.
CPC . *H04W 4/22* (2013.01); *H04W 4/04* (2013.01); *H04W 64/00* (2013.01); *H04W 48/04* (2013.01)
USPC .................. 455/456.1; 455/456.2; 455/456.3; 455/456.5; 455/456.6

(58) Field of Classification Search
None
See application file for complete search history.

(56) References Cited

U.S. PATENT DOCUMENTS

| 2004/0186902 | A1 | 9/2004 | Stewart |
| 2008/0039118 | A1* | 2/2008 | Hyun et al. ................ 455/456.1 |
| 2010/0167725 | A1 | 7/2010 | Noldus et al. |
| 2010/0227554 | A1 | 9/2010 | Jabara et al. |
| 2011/0140962 | A1 | 6/2011 | McNamara et al. |
| 2012/0284412 | A1 | 11/2012 | Saidi et al. |

OTHER PUBLICATIONS

International Search Report and Written Opinion, mail date Oct. 31, 2013, PCT/ISA/210, PCT/ISA/220, PCT/ISA/237, total of 11 pages.

* cited by examiner

*Primary Examiner* — Suhail Khan
(74) *Attorney, Agent, or Firm* — Pillsbury Winthrop Shaw Pittman LLP

(57) ABSTRACT

A wireless location information system, device, and method are directed to a plurality of location origin network transceivers (LONTs) configured to facilitate wireless communications, and provide notification information of their presence within a servicing area and a wireless device including one or more transceivers configured to transmit and receive wireless signals and a location information database configured to store location-related information. Upon the wireless device entering the area serviced by the LONTs, the wireless device detects the presence of one or more LONTs, initiates an autonomous connection request with the detected LONTs, establishes a partial association connection link with the detected LONTs, the partial association connection link being insufficient to establish full network attachment connectivity, initiates location-related information request with the LONTs, retrieves the location-related information provided by the LONTs, and stores the location-related information in the location information database.

20 Claims, 3 Drawing Sheets

SYSTEM AND METHOD FOR AUTONOMOUS CONNECTIVITY TO IMPROVE LOCATION-BASED INFORMATION

TECHNICAL FIELD

This disclosure relates generally to the field of wireless communications, and in particular, to wireless location/positioning systems and methods.

BACKGROUND ART

Given the advent of applications and services directed to marketing opportunities and social networking, it has become increasingly important to accurately determine the location or position of wireless devices. As such, location information systems have recently experienced a great deal of interest and popularity.

Location information systems include outdoor navigation technologies based on global-navigation-satellite-systems and global positioning systems (e.g., GNSS, GPS, GLONASS, Galileo, COMPASS, etc.). However, navigation technologies do not work well for indoor applications, as indoor environments do not facilitate the effective reception of satellite signals. As a result, indoor navigation technologies have been recently developed that are based on wireless communication networks (e.g., WLAN, WWAN, etc.). However, such technologies are specifically designed and used for communication purposes and are, therefore, not necessarily optimized for location information services.

DETAILED DESCRIPTION

Figure 1:
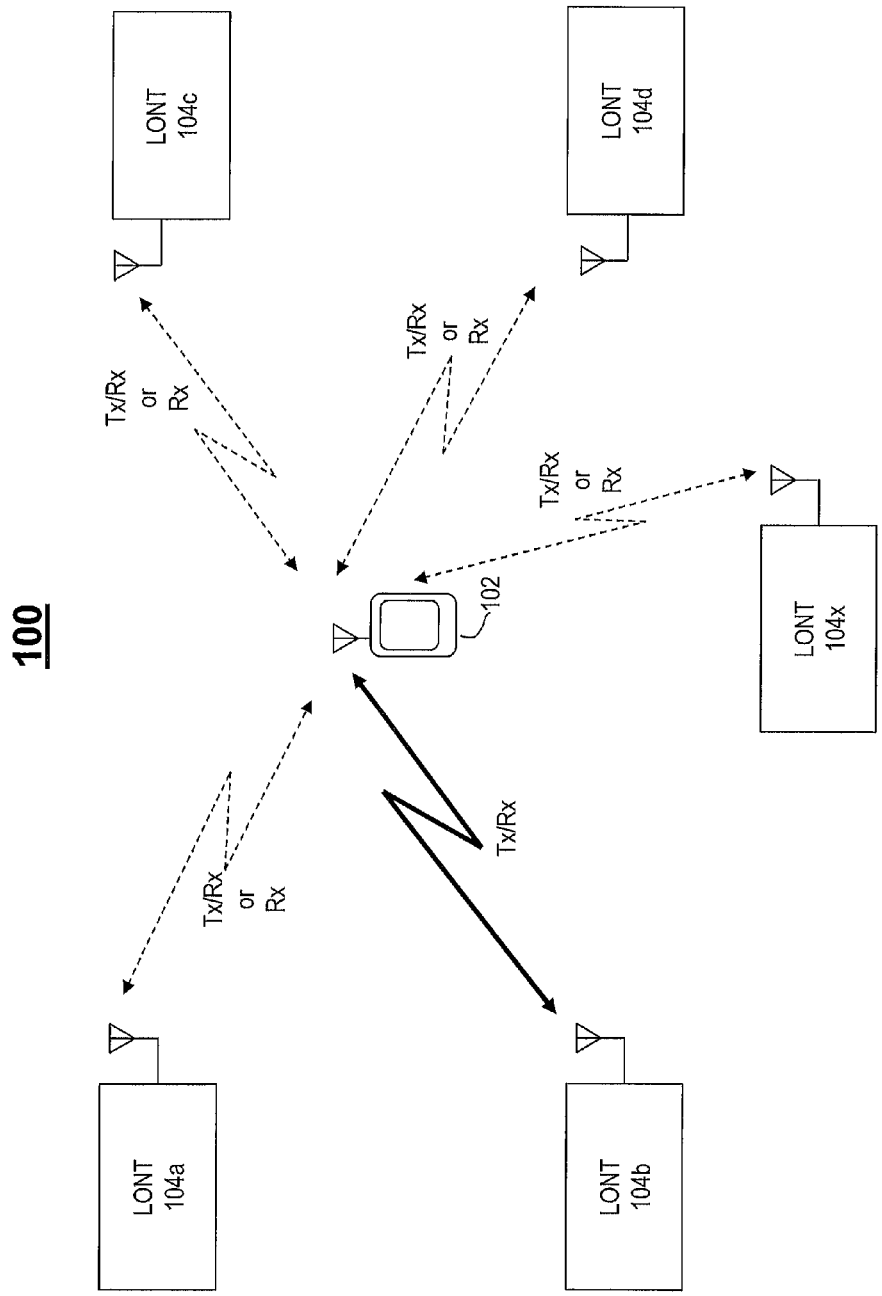
FIG. 1 depicts an overview of a wireless location information system, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is a wireless location information system that includes a plurality of location origin network transceivers (LONTs) configured to facilitate wireless communications, and provide notification information of their presence within a servicing area. In addition, a wireless device includes one or more transceivers configured to transmit and receive wireless signals and a location information database configured to store location-related information. Upon the wireless device entering the area serviced by the LONTs, the wireless device detects the presence of one or more LONTs, initiates an autonomous connection request with the detected LONTs, establishes a partial association connection link with the detected LONTs, the partial association connection link being insufficient to establish full network attachment connectivity, initiates location-related information request with the LONTs, retrieves the location-related information provided by the LONTs, and stores the location-related information in the location information database.

In another embodiment, a method is presented determines location information in a wireless system that includes a plurality of location origin network transceivers (LONTs) configured to facilitate wireless communications and provide notification information of their presence within a servicing area. The method includes detecting one or more of the LONTs based on the notification information, initiating an autonomous connection request with the detected one or more LONTs; establishing a partial association connection link with the detected one or more LONTs, the partial association connection link being insufficient to establish full network attachment connectivity; initiating location-related information request with the one or more LONTs; retrieving the location-related information provided by the one or more LONTs via the established partial association connection link; and storing the location-related information in a location information database.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Typically, for current location information systems, wireless location devices (LDs) desirous of achieving position identification must first conduct various preliminary steps to "fully associate" or establish full network attachment with a single Location Origin Network Transceiver (LONT) in order to exchange relevant location data. In addition, the current implementations do not allow for the preservation of network endpoint connectivity while attempting to associate or achieve network attachment with other LONTs. Thus, in current location information systems, a substantial amount of power is consumed and a significant amount of time is spent during the preliminary stages of the location process while such systems also lack the ability to connect and exchange data with other LONTs in an effort to provide higher resolution location information.

Therefore, what is proposed is a location information system and method that employs an autonomous connectivity mechanism that achieves partial association with other one or more relevant LONTs. In this manner, key performance indicators (KPIs), such as, for example, position solution (FIX), time to first FIX (TTFF), etc. of the location information may be significantly improved by partially associating with relevant LONTs while also reducing LD power consumption.

As such, FIG. 1 depicts an overview of wireless location information system 100, in accordance with various aspects and principles of the present disclosure. The architecture of wireless location information system 100 comprises a plurality of Location Origin Network Transceiver (LONTs) 104a-104x that are configured to wirelessly communicate with location device (LD) 102 within a certain servicing area.

The terms "Location Origin Network Transceiver" and "LONT" refer to any device with the ability to wirelessly transmit signals comprising relevant location information elements to, and receive wireless signals comprising relevant location information elements from, one or more wireless devices, such as, for example, LD 102, within a certain service area (e.g., vicinity, neighborhood, cell area, geographic area, etc.). Such relevant location information elements enable the LD to calculate its position, velocity, time (PVT) data or other location related data and events, as well as provides access to a corresponding network, such as a local area network (LAN), wide area network (WAN), Internet, etc. Depending on the wireless network technology, LONTs may take the form of a cellular base transceiver system (BTS), a network access point (AP), BT transceiver, RFID transceiver, etc. As such, LONTs 104a-104x may correspond to the same or similar networks or may equally correspond to different networks and/or different network technologies. For example, LONTs 104a-104x may all operate under Wi-Fi or WiMax communication standards or some of LONTs 104a-104x may operate under WiMax standards while others may operate under 4G LTE communication standards. Regardless of the corresponding wireless network technologies employed, LONTs 104a-104x will comprise antenna(s), radio-frequency transmitter(s)/receiver(s), processor(s), router functionality, and any other components suitable for communication purposes consistent with the related wireless network technologies.

LONTs may also be configured to broadcast radio-frequency (RF) beacon signals to announce their presence within a certain service area or vicinity, thereby notifying LDs of their existence. LONTs may be further configured to provide information regarding other LONTs that operate under the same wireless technology, protocol, and/or network and service the same vicinity (i.e., neighbor LONT list).

The terms "Location Device" and "LD" refer to any device that may communicate with other devices via wireless signals and may wirelessly connect to and communicate with several LONTs corresponding to similar networks or different networks at the same time. Such devices may comprise, for example, a laptop, mobile device, cellular/smartphone, gaming device, tablet computer, a wireless-enabled patient monitoring device, personal communication system (PCS) device, personal digital assistant (PDA), personal audio device (PAD), portable navigational device, and/or any other electronic wireless-enabled device configured to receive a wireless signal. As such, LDs may be configured with variety of components, such as, for example, processor(s), memories, display screen, camera, input devices as well as communication-based elements. The communication-based elements may include, for example, antenna, interfaces, transceivers, modulation/demodulation and other circuitry, configured to wirelessly communicate and transmit/receive information. The communication-based elements may be configured to support various wireless network technologies. LDs may also include a bus infrastructure and/or other interconnection means to connect and communicate information between various components and communication elements noted above.

The processor(s) of the LDs may be part of a core processing or computing unit that is configured to receive and process input data and instructions, provide output and/or control other components of the LDs in accordance with embodiments of the present disclosure. Such processing elements may include a microprocessor, a memory controller, a memory and other components. The microprocessor may further include a cache memory (e.g., SRAM), which along with the memory may be part of a memory hierarchy to store instructions and data. The microprocessor may also include one or more logic modules such as a field programmable gate array (FPGA) or other logic array.

The memories of the LDs may take the form of a dynamic storage device coupled to the bus infrastructure and configured to store information, instructions, and application programs to be executed by the processor(s) or controller(s) associated of the LDs. Some or all of the memory may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. LDs may also include read only memory (ROM) and/or other static storage devices coupled to the bus infrastructure and configured to store static information and instructions for the processor(s) and/or controller(s) associated with the LDs.

It will be appreciated that the general location information of LD 102, as provided by system 100, may be based on a variety of methods. By way of illustration, assuming that the exact coordinate positions of the LONTs are known, to estimate the three dimensional location information, at least three LONTs are required, and if timing correction/offset information is also needed, at least another LONT is required. With the coordinate positions of the LONTs, a method based on received signal strength (RSSI) at the LD may be used to estimate the one-way distance between the LD and LONTs if the transmitted power of the LONTs and dependence of signal strength on distance is known. Another method based on Time-of-flight (ToF) (i.e., over-the-air propagation time) may be used, which measures the overall interval of time taken for a signal that propagates from the LD to the LONTs and back to the LD. The overall time interval may be converted into a round-trip distance by multiplying it by the speed of light and then converted to estimate a one-way distance between the LDs and LONTs by dividing the round-trip distance by two.

Armed with the estimated one-way distances between the LD and LONTs, either by the RSSI or ToF methods or any other methods and combinations thereof, triangulation and/or trilateration techniques may be subsequently applied to the estimated one-way distances to converge on the general location of LD.

Figure 2:
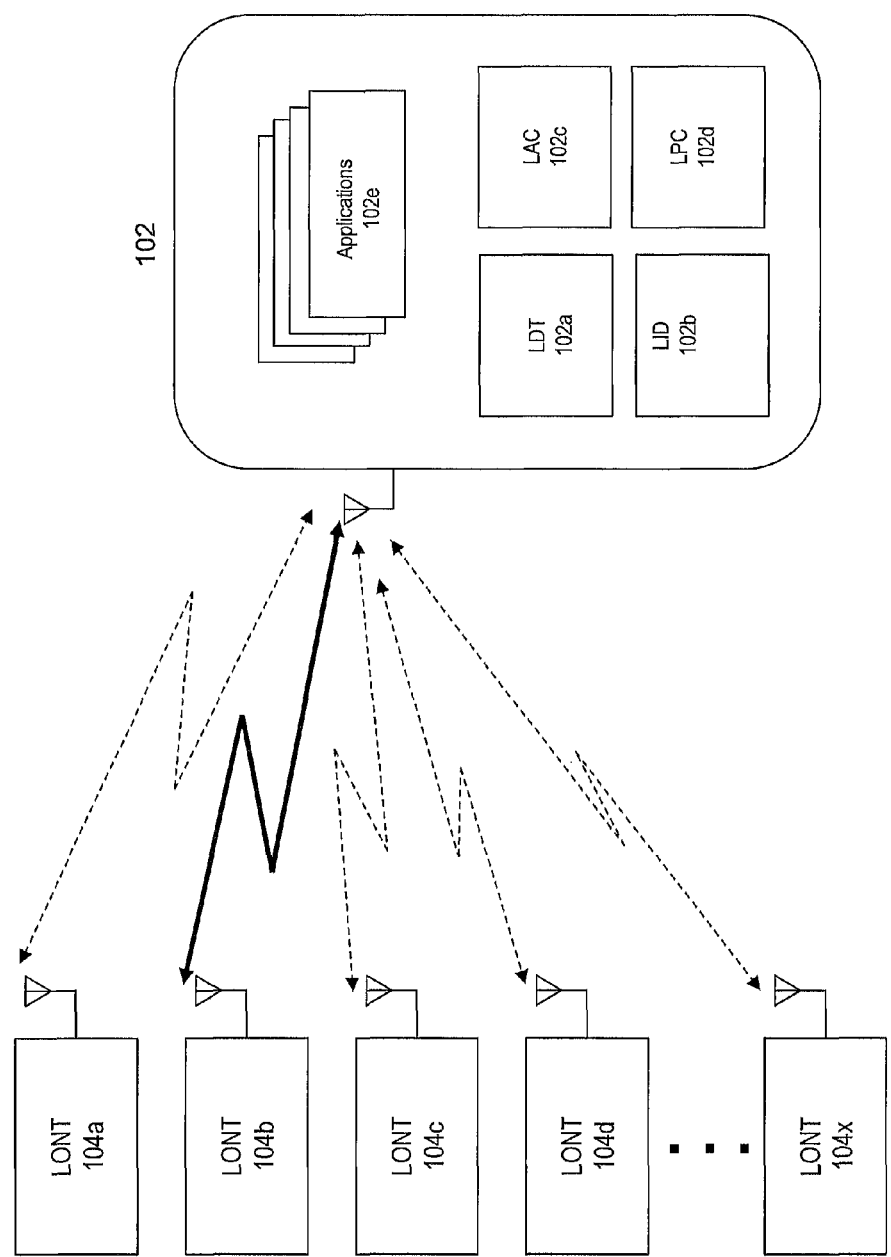
FIG. 2 depicts a functional block diagram a wireless location information system, in accordance with various aspects and principles of the present disclosure.

Turning attention to FIG. 2, this figure depicts a functional block diagram of wireless location information system 100 that improves the accuracy of the general location of LD 102, in accordance with various aspects and principles of the present disclosure. By way of illustration, LD 102 may be previously associated with LONT 104b (see, e.g., solid arrow) and have full network attachment facilitating the two-way exchange of information. However, such association and full network attachment is not intended to be limiting, as LD 102 may not be associated with any of LONTs 104a-104x and still be consistent with the various aspects of present disclosure.

As noted above, LONTs 104a-104x may be configured to broadcast beacon signals to notify LD 102 of additional or candidate LONTs within the service vicinity. Alternatively, or in addition to, LONTs 104a-104x may include neighbor LONT lists that also serve to notify LD 102 of candidate LONTs within the service vicinity. So, LD 102 may detect (i.e., via a discovery stage) the existence of candidate LONTs 104a, 104c-104x within the service vicinity as indicated in FIG. 2 (see, e.g., dashed arrows), by the methods noted above or by any other suitable method or combinations thereof.

Upon being notified of candidate LONTs 104a, 104c-104x, LD 102 may initially select one of the relevant LONTs from all the detected candidate LONTs to communicate with (i.e., via a selection stage), based on pre-specified operational criteria. Such operational criteria may include, for example, the selected LONT being the first LONT that the LD 102 encounters, the selected LONT being the closest LONT to LD 102, the selected LONT having the strongest signal, the selected LONT being the least busy due to current traffic loads, etc.

After selecting one of the LONTs, LD 102 may be configured with an autonomous connectivity mechanism that initiates an autonomous partial-association connection process with one or more candidate LONTs to improve the location accuracy. As will be described in greater detail below, while the partial-association connection is insufficient to establish full network attachment connectivity (i.e., full association connectivity), a link may be established that enables the transfer of various pre-association transactions. It will be appreciated, however, that unlike conventional full association stages, the autonomous partial-association connection process exploits the opportunity to exchange location-related information preliminarily between the LD 102 and candidate LONTs 104a, 104c-104x without having to pursue or achieve full network attachment or network association and risk disconnection of a previously established association, such as the established association of LONT 104b.

Returning to FIG. 2, LD 102 may be configured to further comprise location device transceivers (LDT) 102a, LONT information database (LID) 102b, location association controller (LAC) 102c, location policy controller (LPD) 102d, and applications 102e. LDT 102a is configured to receive and transmit wireless signals as well as decode relevant wireless protocols. LID 102b may be configured with relevant location-related information that assists in detecting the relevant. LONTs (e.g., frequency, wireless access methodology, etc.) and triangulation/trilateration assistance information (e.g., LONT's coordinates, privacy location, etc.). LAC 102c controls the autonomous partial-association connection process with each of candidate LONTs 104a, 104c-104x and retrieves various location-related information and/or transmission parameters that are stored in LID 102b.

LPD 102d may be configured to select the relevant LONTs from all the detected LONTs and define the optimal access and connectivity methodology based on the LD working/operating profiles. Applications 102e are applications local to LD 102 and are configured for a variety of operations of LD 102, including communications functionality. For example, in one non-limiting embodiment, applications 102e may be configured to initiate a request to the location policy controller LPD 102d and based on the LPD policies, determine the LD 102 operation mode and the target location key performance indicators (KPIs).

With this architecture, LD 102 may initiate the autonomous partial-association connection process with one of the detected candidate LONTs 104a, 104c-104x. During the partial-association connection, there exists the opportunity to exchange location-related information needed by the selected LONT and LDT 102a to establish a link and store, update, and maintain real-time and non-real time location-related information LID 102b.

The location-related information maintained by LID 102b may be based on a LONT list sent by the network or self-discovery and detection of candidate LONTs or a combination of both. As will be discussed below, the location-related information maintained by LID 102b may include: (a) parameters that can be measured without any assistance from candidate LONTs; (b) information exchanged over a bidirectional link with the LONTs (e.g., frequency, power, timing information, etc.); (c) any relevant information that may affect the location estimation process (e.g., received signal quality, frequency synchronization, signal power synchronization, wave propagation parameters, propagation time, time corrections, etc.); and (d) request for specific location broadcast/unicast information (e.g., request that the LONT will transmit its position coordinates via broadcast messages, etc.).

As noted above, the autonomous partial-association connection process is performed with candidate LONTs 104a, 104c-104x. In particular, the autonomous partial-association connection process is performed individually with each of candidate LONTs 104a, 104c-104x, at both the PHY and MAC levels of LDT 102a, which is controlled by LAC 102c. In this manner, LDT 102a operates to decode the relevant signals/messages/protocols and identification information, such as, for example, PHY ID, MAC ID, BSS ID, etc. LD 102 then processes the MAC level broadcast, multicast, or unicast messages and PHY level detection to synchronize the candidate LONTs 104a, 104c-104x in anticipation of establishing a partial-association connection.

During the partial-association connection, a unidirectional or bidirectional link is established, so that location-related information needed for improving the location key performance indicators (KPIs) (e.g., accuracy of location estimations, etc.) are exchanged between LDT 102a and the candidate LONTs 104a, 104c-104x, in which the location-related information and/or transmission parameters are subsequently transferred to LAC 102c. It will be appreciated that LDT 102a and/or LAC 102c or some other entity or combinations thereof, perform basic connectivity functions to establish the connection, such as, for example, detection, downlink decoding, identification and synchronization to candidate LONTs 104a, 104c-104x, using techniques well-known in the art. LAC 102c forwards the relevant the transmission parameters to the information database LID 102b for storage.

Upon establishing the partial-association link, wireless communication protocols prescribe a scheduled time slot in which the LD can transmit a message to a LONT. As such, in some embodiments, LD 102 may transmit a message requesting parameter information, such as, time and frequency offset correction, received RSSI, multiple input multiple output (MIMO) RF parameters, power control corrections, applicable master control station (MCS), etc., to candidate LONTs 104a, 104c-104x. In other embodiments, LD 102 may transmit messages requesting other transmission parameters that bear on the accuracy of the location of LD 102, such as, received signal quality, synchronization information (in frequency and time), signal power synchronization, wave propagation parameters, propagation time, time corrections, network/operator ID, cell type (i.e. macro, micro, pico, femto, etc.) and service capabilities (e.g., current load).

Using the parameters and feedback information (i.e., PHY level elements and/or MAC level elements) provided by LONTs 104a, 104c-104x, LD 102 is configured to build and maintain a location database of LONTs (stored at LID 102b)

that contain information regarding relevant and irrelevant candidate LONTs. As noted above, the LONTs' feedback information and parameters, acquired or transmitted from the LONTs and received by LD 102 may include, for example, received signal quality, synchronization information (in frequency and time), signal power synchronization, wave propagation parameters, propagation time, time corrections, network/operator ID, cell type (i.e. macro, micro, pico, femto, etc.) and service capabilities (e.g., current load). Example feedback information and parameter sets that may be used for the measurement and association opportunities the results of which are used to build and maintain a database of LONTs is described below.

In preserving the single full network attachment (i.e., full association) of LD 102 and LONT 104*b*, LD 102 attempts the autonomous partial association connection process with the remaining candidate LONTs. In so doing, the full network attachment between LD 102 and LONT 104*b*, based on the previously established association, remains undisturbed. During the pre-association connection stage, LD 102 autonomously and anonymously transmits signals to and receives feedback information (also referred to as PHY level elements and/or MAC level elements) from the remaining candidate LONTs 104*a*, 104*c*-104*x*. Based on the received signals and feedback information, LD 102 is able to tune transmission parameters in a precise manner as well as exchange location-related information.

Figure 3:
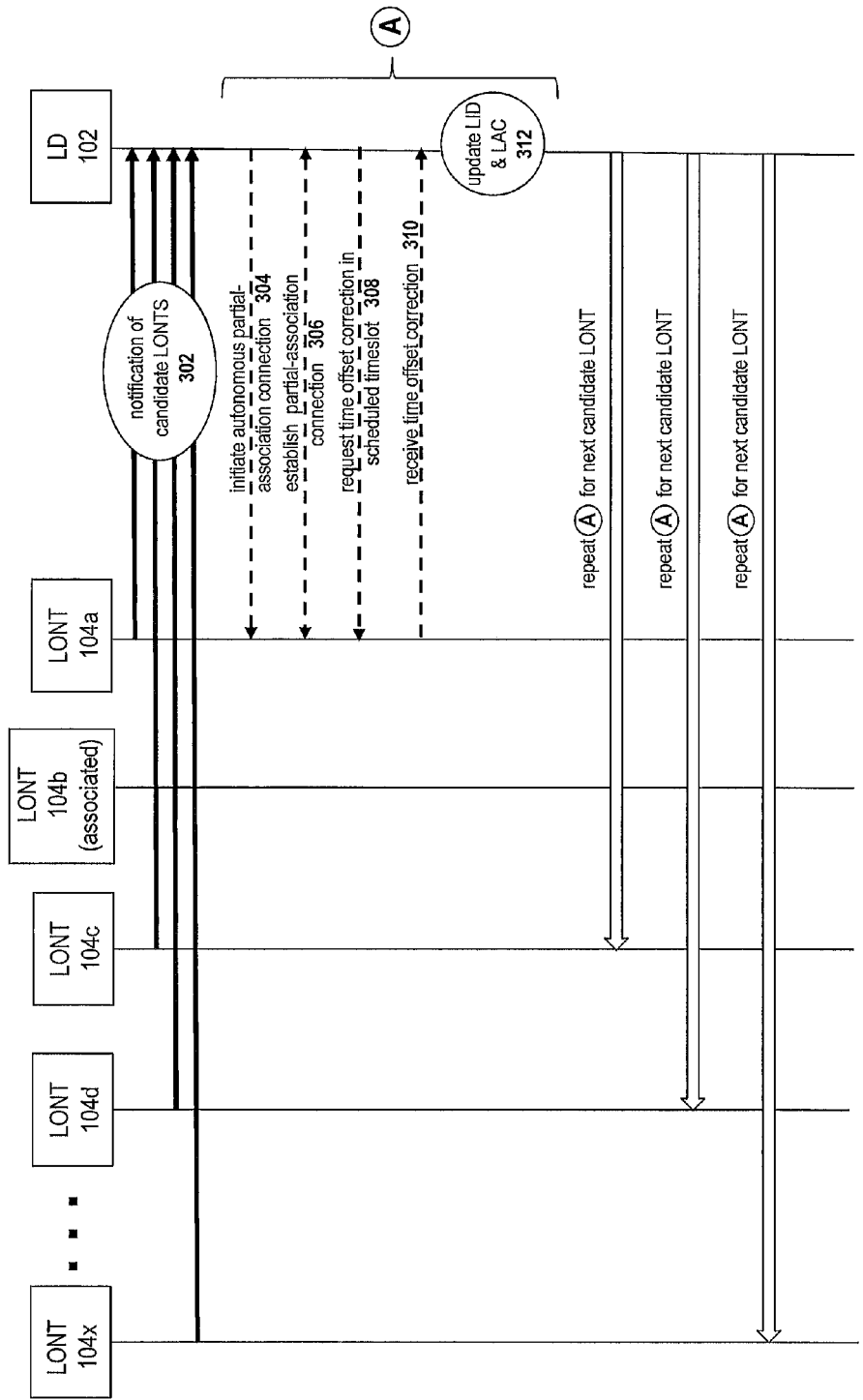
FIG. 3 depicts a message flow diagram illustrating an exemplary process for providing location information in a wireless system, in accordance with various aspects and principles of the present disclosure.

FIG. 3 depicts a message flow diagram illustrating process 300 for providing location information in a wireless system, in accordance with various aspects and principles of the present disclosure. Process 300 is represented as a transactional message flow diagram illustrating transactional messages between LD 102 and candidate LONTs 104*a*, 104*c*-104*x*.

As indicated by message 302, LD 102 may detect the existence of candidate LONTs 104*a*, 104*c*-104*x* within the service vicinity based on notification by the LONTs, as described above. In message 304, LD 102 selects one of candidate LONTs, LONT 104*a*, for example, to initiate an autonomous partial-association connection and sends a specific request for autonomous partial-association connection. Message 304 may also request or specify a set of location relevant information elements.

As noted in message 306, LD 102 achieves a pre-association connection with LONT 104*a* by LDT 102*a* establishing a link, as discussed above. Message 306 may contain the set of location relevant information elements defined by message 304. In message 308, LD 102 transmits a message requesting transmission of specific parameter information (based on 306 or other criteria), such as, for example, time offset correction within a prescribed time slot scheduled by LONT 104*a*.

In response, LONT 104*a* transmits the time offset correction information to LD 102, in message 310. At message 312, LD 102 forwards the time correction information to LID 102*b* to update the transmission parameter data stored in LID 102*b*. In this manner, should LD 102 conduct a future transaction with the same LONT (i.e., LONT 104*a*), LD 102 may only need to perform message transactions 308 and 310, since it has already conducted the necessary negotiations with LONT 104*a* at message transactions 304 and 306.

As depicted in FIG. 3, messages 302-312 are subsequently repeated for remaining candidate LONTs or a portion of remaining LONTs.

The autonomous connectivity mechanism that initiates an autonomous partial-association connection process, as described above, is applicable to a LD that employs a single location origin technology or multi-location origin technologies. The autonomous connectivity mechanism, therefore, provides the capability of exchanging location-related information and transmission parameters from multiple LONTs while preserving a single network attachment connectivity to an original LONT, such as, a cellular BTS, AP, etc. by enabling partial association without achieving full network connectivity with a second LONT. As noted above, this feature allows the LDTs to use a prescribed, scheduled, free timeslot to exchange location-related information and transmission parameters between the LD and LONT while preserving the single endpoint connectivity. These pre-association connection opportunities are created by the user equipment autonomously and anonymously in accordance with current activity patterns, thereby eliminating any bandwidth waste and reducing power consumption. This mechanism also works without any modification to current access protocols.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

What is claimed is:

1. A wireless location information system, comprising:
    a plurality of location origin network transceivers (LONTs) configured to facilitate wireless communications, the LONTs providing notification information of their presence within a servicing area; and
    a wireless device configured to wirelessly communicate with one or more LONTs, the wireless device including one or more transceivers configured to transmit and receive wireless signals and a location information database configured to store location-related information,
    wherein, upon the wireless device entering the area serviced by the LONTs, the wireless device:
        detects the presence of one or more LONTs based on the notification information,
        initiates an autonomous connection request with the detected one or more LONTs,
        establishes a partial association connection link with the detected one or more LONTs, the partial association connection link being insufficient to establish full network attachment connectivity,
        initiates location-related information request with the one or more LONTs,
        retrieves the location-related information provided by the one or more LONTs via the established partial association connection link, and
        stores the location-related information in the location information database.

2. The wireless location information system of claim 1, wherein one or more of the LONTs operate under different wireless communication network protocols.

3. The wireless location information system of claim 1, wherein the provisioning of LONT notification information includes broadcasting beacon signals, forwarding LONT neighbor listing information, or a combination thereof.

4. The wireless location information system of claim 1, wherein a previously established full network attachment connection between the wireless device and a LONT is maintained while the partial association connection link is established between the wireless device and the one or more LONTs.

5. The wireless location information system of claim 1, wherein the location-related information stored in the location information database includes one or more of the following: received signal quality, time synchronization information, frequency synchronization information, signal power synchronization, wave propagation parameters, propagation time, timing corrections, network/operator ID, cell type, and current network load.

6. The wireless location information system of claim 1, wherein the wireless device further includes a location association controller configured to control the partial association connection link with each of the one or more LONTs.

7. The wireless location information system of claim 1, wherein the wireless device further includes a location policy controller configured to control selection of the one or more LONTs and define optimal access and connectivity methodology based on wireless device operating profiles.

8. The wireless location information system of claim 1, wherein the location-related information request with the one or more LONTs is transmitted during a timeslot prescribed by the one or more LONTs.

9. A method of determining location information in a wireless system that includes a plurality of location origin network transceivers (LONTs) configured to facilitate wireless communications and provide notification information of their presence within a servicing area, the method comprising:
    detecting one or more of the LONTs based on the notification information;
    initiating an autonomous connection request with the detected one or more LONTs,
    establishing a partial association connection link with the detected one or more LONTs, the partial association connection link being insufficient to establish full network attachment connectivity,
    initiating location-related information request with the one or more LONTs,
    retrieving the location-related information provided by the one or more LONTs via the established partial association connection link, and
    storing the location-related information in a location information database.

10. The method of claim 9, wherein one or more of the LONTs operate under different wireless communication network protocols.

11. The method of claim 9, wherein the provisioning of LONT notification information includes broadcasting beacon signals, forwarding LONT neighbor listing information, or a combination thereof.

12. The method of claim 9, further including maintaining a previously established full network attachment connection while the partial association connection link is established.

13. The method of claim 9, wherein the storing of the location-related information includes one or more of the following: received signal quality, time synchronization information, frequency synchronization information, signal power synchronization, wave propagation parameters, propagation time, timing corrections, network/operator ID, cell type, and current network load.

14. The method of claim 9, wherein transmission of the location-related information request occurs during a pre-specified time slot.

15. A wireless device, comprising:
    one or more transceivers configured to transmit and receive wireless signals;
    a location information database configured to store location-related information; and
    logic configured to:
        detect presence of one or more location origin network transceivers (LONTs) of a plurality of LONTs,
        initiate an autonomous connection request with the detected one or more LONTs,
        establish a partial association connection link with the detected one or more LONTs, the partial association connection link being insufficient to establish full network attachment connectivity,
        initiate location-related information request with the one or more LONTs,
        retrieve the location-related information provided by the one or more LONTs via the established partial association connection link, and
        store the location-related information in the location information database.

16. The wireless device of claim 15, wherein a previously established full network attachment connection between the wireless device and a LONT is maintained while the partial association connection link is established between the wireless device and the one or more LONTs.

17. The wireless device of claim 15, wherein the location-related information stored in the location information database includes one or more of the following: received signal quality, time synchronization information, frequency synchronization information, signal power synchronization, wave propagation parameters, propagation time, timing corrections, network/operator ID, cell type, and current network load.

18. The wireless device of claim 15, wherein the wireless device further includes a location association controller configured to control the partial association connection link process with each of the one or more LONTs.

19. The wireless device of claim 15, wherein the wireless device further includes a location policy controller configured to control selection of the one or more LONTs and define optimal access and connectivity methodology based on wireless device operating profiles.

20. The wireless device of claim 15, wherein the location-related information request with the one or more LONTs is transmitted during a timeslot prescribed by the one or more LONTs.

* * * * *